Figure 1:
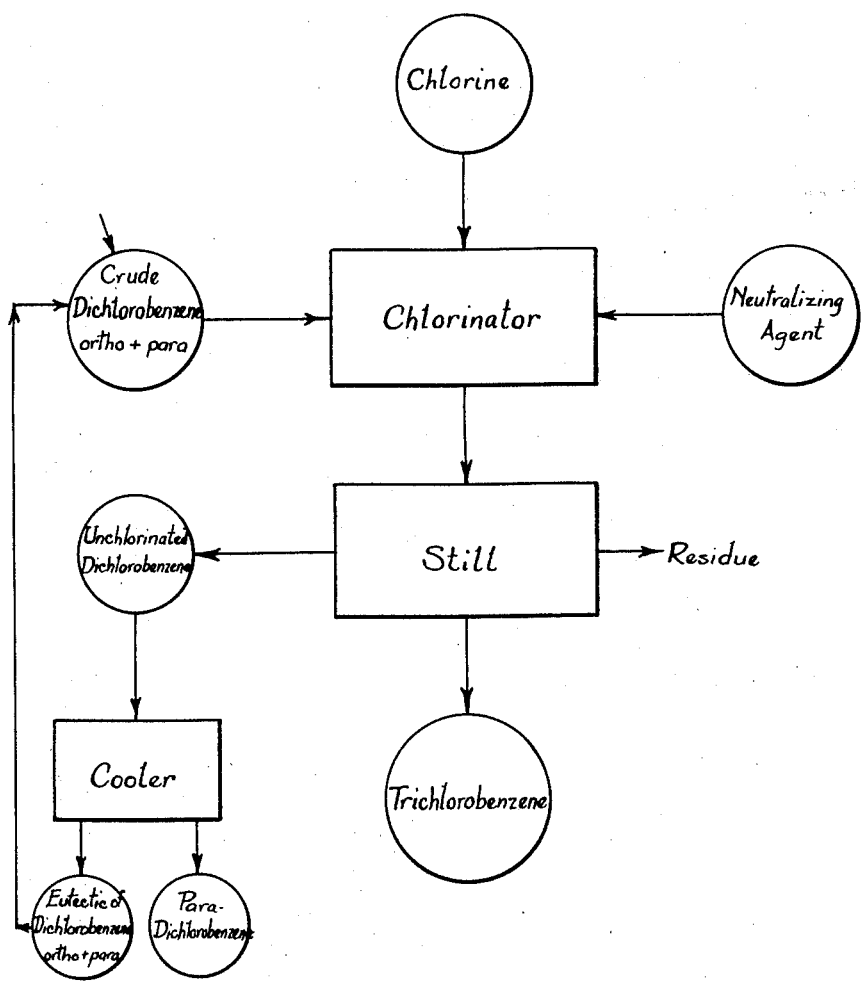

Aug. 22, 1933.                  E. C. BRITTON                 1,923,419
                         PREPARATION OF TRICHLOROBENZENE
                              Filed March 16, 1932

INVENTOR
BY Edgar C. Britton
Thomas Griswold, Jr.
ATTORNEY

Patented Aug. 22, 1933

1,923,419

UNITED STATES PATENT OFFICE 1,923,419

PREPARATION OF TRICHLOROBENZENE

Edgar C. Britton, Midland, Mich., assignor to The Dow Chemical Company, Midland, Mich., a Corporation of Michigan Application March 16, 1932. Serial No. 599,182

5 Claims. (Cl. 260—161)

The invention relates to processes for the production of trichlorobenzene, and more especially to a process for the production of trichlorobenzene by chlorinating mixtures of ortho- and para- dichlorobenzene obtained as a by-product in the manufacture of para- dichlorobenzene.

Para- dichlorobenzene is generally prepared by chlorinating benzene and subsequently freezing out the para- dichloro-compound from the mixture of ortho- and para- dichlorobenzene resulting from the chlorination process. However, it is impossible to freeze out all of the para- dichlorobenzene since the ortho- and para- compounds form an eutectic mixture containing about 86 per cent, by weight, of ortho- and 14 per cent of para-. It is very difficult to separate mixtures of ortho- and para- dichlorobenzene by distillation, since there is less than 7° C. difference in the boiling points of the two compounds, and it has not been found commercially practicable to recover the para- compound by distilling mixtures thereof with the ortho- compound. Consequently, in the usual process of making para- dichlorobenzene, a residual product is obtained consisting of a mixture of the para- and ortho- compounds which cannot be further separated by usual means.

I have found that a mixture of ortho- and para- dichlorobenzene, such as the residual mixture hereinbefore mentioned, can be selectively chlorinated in such manner that the ortho- dichlorobenzene therein is substantially chlorinated to trichlorobenzene (a mixture of 1, 2, 3- and 1, 2, 4-), and the para- dichlorobenzene contained in the original mixture remains substantially unreacted and can then be recovered as such from the reaction product by the usual steps of distillation and crystallization.

Accordingly, it is an object of this invention to set forth a process by which a mixture of ortho- and para- dichlorobenzene can be treated to produce trichlorobenzene and concurrently to recover the para- dichlorobenzene contained in the initial mixture.

To the accomplishment of the foregoing and related ends, the invention, then, consists of the features hereinafter fully described and particularly pointed out in the claims, the annexed drawing and the following description setting forth in detail one mode of carrying out the invention, such disclosed mode illustrating, however, but one of the various ways in which the principle of the invention may be realized.

In said annexed drawing:—

The single figure is a flow sheet representing diagrammatically the flow of materials through apparatus adapted to carry out my process.

In practicing my invention by chlorinating a crude dichlorobenzene mixture of ortho- and para- compounds in about their eutectic proportions, such as that obtained as a by-product residue in the preparation of para- dichlorobenzene, I have found it advantageous to carry the chlorination of the crude eutectic mixture only to about a 50 per cent conversion thereof to trichlorobenzene in one step. By proceeding in this way I have found that the chlorination takes place substantially only with the ortho- dichlorobenzene, while the para- compound remains substantially unreacted. If materially more than 50 per cent of the said crude mixture is converted to trichlorobenze, or, in general, when the ratio of ortho- to para- dichlorobenzene in the crude mixture becomes less than 3 parts of ortho- to 1 part of para-, the para- compound will begin to be chlorinated.

Therefore, in order to avoid the chlorination of any substantial amount of the para- compound, I stop the chlorination of the crude eutectic when about 50 per cent thereof has been converted to trichlorobenzene, or, in general, I stop the chlorination of crude dichlorobenzene when the ratio of ortho- to para- therein becomes less than 3 parts of ortho- to 1 part of para-. I then distill off the unreacted dichlorobenzene fraction from the partially chlorinated reaction mixture, cool the distillate to freeze out the para- dichlorobeneze present therein in excess of the amount which will form an eutectic with the unreacted ortho- compound in the said fraction, and then separate the solid para- compound from the mother liquor. Then I may recycle the mother liquor to the chlorinator where it may again be treated in the manner outlined above. By this procedure I substantially avoid the possibility of chlorinating any of the para- dichlorobenzene originally present, meanwhile converting the ortho- compound to trichlorobenzene. By a very few repetitions of the foregoing steps nearly all of the ortho- dichlorobenzene in the original mixture may be converted to trichlorobenzene.

Referring to the drawing, a mixture of crude dichlorobenzene containing both the ortho- and para- compounds, for instance in approximately the eutectic proportions aforesaid, is introduced into a chlorinator wherein it is treated at a temperature between about 30° and 50° C., preferably between 40° and 50° C., with chlorine in the amount required to cause up to about 50 per cent of the crude dichlorobenzene therein to be converted to trichlorobenzene. The chlorination is conducted in the presence of a suitable chlorinating catalyst, e. g. anhydrous ferric chloride. The mixture is then treated with an alkali, such as sodium carbonate, to neutralize the hydrochloric acid formed in the reaction. The product is then drawn off from the chlorinator and distilled under atmospheric pressure. The unchlorinated ortho-, and substantially all of the para- dichlorobenzene initially present, distill off first at a temperature up to about 185° C., and the trichlorobenzene distills off at a temperature between 30° and 40° C. higher. The distillation may be conducted under reduced pressure with corresponding change in the temperature at which the compounds distill off. The mixture of unchlorinated ortho- and para- dichlorobenzene obtained as the first fraction from the distillation is then cooled to freeze out the excess of para- dichlorobenzene above that which is necessary to form an eutectic mixture with the unchlorinated ortho- dichlorobenzene remaining therein, and the crystals are separated from the liquid eutectic residue of ortho- and para- compounds, which is returned to the chlorinator.

As a specific example, I will describe the treatment by my process of a mixture of crude dichlorobenzene containing 1726.5 grams of ortho- and 288.3 grams of para- dichlorobenzene, or, by weight, 85.7 per cent ortho- and 14.3 per cent para-. The aforesaid mixture was treated with 520 grams of chlorine by passing the chlorine into the mixture, which was heated to about 45° C., and then neutralized with dry sodium carbonate, followed by fractional distillation at ordinary atmospheric pressure. The first fraction was removed when the temperature reached 185° C. The weight of this fraction was 900.6 grams, and it was found to contain 69.8 per cent of ortho- and 30.2 grams of para- dichlorobenzene, or by weight, 628.6 grams of ortho- and 272.0 grams of para-. This first fraction was then cooled to —15° C. and the solid para- dichlorobenzene in excess of approximately the eutectic mixture was filtered out. 121.1 grams of para- dichlorobenzene was recovered, and the eutectic residue remaining after recovering the para- dichlorobenzene was returned to the chlorinator to be treated again. The amount of ortho- dichlorobenzene converted to trichlorobenzene was 1097.9 grams or 63.6 per cent of the initial quantity of ortho- dichlorobenzene.

Although the utility of my invention is greatest when applied to crude dichlorobenzene mixtures wherein the ortho- compound predominates in about the ratio of 6 parts of ortho- to 1 part of para-, i. e., in about the eutectic proportions, it may advantageously be applied to any crude dichlorobenzene mixture wherein the ortho- compound predominates in greater proportion than about 3 parts of ortho- to 1 part of the para- compound.

Other modes of applying the principle of my invention may be employed instead of the one explained, change being made as regards the process herein disclosed, provided the step or steps stated by any of the following claims or the equivalent of such stated step or steps be employed.

I therefore particularly point out and distinctly claim as my invention:—

1. A process for preparing trichlorobenzene from a mixture of ortho- and para- dichlorobenzene wherein the ortho- predominates in a ratio of more than 3 parts of ortho- to 1 part of para- which comprises partially chlorinating in the presence of a catalyst the mixture whereby up to 50 per cent of the total dichlorobenzene is converted to 1.2.3- and 1.2.4- trichlorobenzene, distilling the partially chlorinated mixture to separate the unreacted dichlorobenzene from the trichlorobenzene, and recovering para- dichlorobenzene from said unreacted dichlorobenzine.

2. A process for preparing trichlorobenzene from a mixture of ortho- and para- dichlorobenzene wherein the ortho- predominates in a ratio of about 6 parts of ortho- to 1 part of para- which comprises converting up to 50 per cent of dichlorobenzene to 1.2.3- and 1.2.4- trichlorobenzene in the presence of a chlorinating catalyst, distilling the resulting mixture to a temperature of about 185° C. at ordinary atmospheric pressure to separate the unreacted dichlorobenzene from the trichlorobenzene, collecting the fraction distilling off up to about 185° C., and recovering the para- dichlorobenzene present in said fraction in excess of the amount which will form an eutectic with the unreacted ortho- dichlorobenzene in the said fraction.

3. A process for preparing trichlorobenzene from a mixture of ortho- and para- dichlorobenzene wherein the ortho- predominates in a ratio of more than 6 parts of ortho- to 1 part of para- which comprises chlorinating in the presence of a catalyst, the dichlorobenzene at a temperature between 40° and 50° C. whereby about 50 per cent of the dichlorobenzene is converted to 1.2.3- and 1.2.4- trichlorobenzene, neutralizing the mixture, distilling the mixture at ordinary atmospheric pressure and collecting the dichlorobenzeen fraction distilling off below about 185° C. whereby the trichlorobenzene is substantially freed from unreacted dichlorobenzene, cooling the said dichlorobenzene fraction to about —15° C., and separating the solid para- dichlorobenzene therefrom.

4. A process for preparing trichlorobenzene from a mixture of ortho- and para- dichlorobenzene wherein the ortho- predominates in a ratio of more than 6 parts of ortho- to 1 part of para- which comprises chlorinating in the presence of a catalyst the dichlorobenzene at a temperature between 40° and 50° C. whereby about 50 per cent of the dichlorobenzene, is converted to 1.2.3- and 1.2.4- trichlorobenzene, neutralizing the mixture, distilling the mixture at ordinary atmospheric pressure and collecting the dichlorobenzene fraction distilling off below about 185° C. whereby the trichlorobenzene is substantially freed from unreacted dichlorobenzene, cooling the said dichlorobenzene fraction to about —15° C., separating the solid para- dichlorobenzene therefrom, and returning the mother liquor to the first step.

5. A process for the preparation of 1.2.3- and 1.2.4- trichlorobenzene and simultaneous recovery of para- dichlorobenzene from a mixture of ortho- and para- dichlorobenzene wherein the ortho- predominates in a ratio of more than 3 parts of ortho- to 1 part of para- which comprises chlorinating in the presence of a catalyst the said mixture up to the point at which the para- dichlorobenzene remains substantially unreacted thereby converting a part of the ortho- dichlorobenzene to 1.2.3- and 1.2.4- trichlorobenzene, distilling the chlorinated mixture to separate the unreacted ortho- and para- dichlorobenzene from the trichlorobenzenes, and recovering para- dichlorobenzene from said unreacted dichlorobenzene.

EDGAR C. BRITTON.